US009354949B2

(12) United States Patent
Clark (10) Patent No.: US 9,354,949 B2
(45) Date of Patent: May 31, 2016

(54) RUNTIME EMULATING STATIC THREAD LOCAL STORAGE OF PORTABLE EXECUTABLE SOFTWARE CODE

(71) Applicant: VMware, Inc., Palo Alto, CA (US)

(72) Inventor: Jonathan Clark, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 184 days.

(21) Appl. No.: 14/055,597

(22) Filed: Oct. 16, 2013

(65) Prior Publication Data

US 2014/0149996 A1 May 29, 2014

Related U.S. Application Data

(63) Continuation of application No. 12/973,664, filed on Dec. 20, 2010, now abandoned, which is a continuation of application No. 11/552,734, filed on Oct. 25, 2006, now Pat. No. 7,856,637.

(51) Int. Cl.
| G06F 3/00 | (2006.01) |
| G06F 9/44 | (2006.01) |
| G06F 9/46 | (2006.01) |
| G06F 13/00 | (2006.01) |
| G06F 9/54 | (2006.01) |
| G06F 9/445 | (2006.01) |

(52) U.S. Cl.
CPC ............ *G06F 9/542* (2013.01); *G06F 9/44521* (2013.01)

(58) Field of Classification Search
None
See application file for complete search history.

(56) References Cited

U.S. PATENT DOCUMENTS

| 5,946,486 | A  | 8/1999 | Pekowski |
| 5,974,470 | A  | 10/1999 | Hammond |
| 6,760,903 | B1 | 7/2004 | Morshed et al. |
| 2006/0005085 | A1 | 1/2006 | Zunino et al. |
| 2006/0112374 | A1 | 5/2006 | Oliva |

OTHER PUBLICATIONS

Microsoft Corp. Microsoft Portable Executable and Common Object File Formal Specification, Microsoft Corporation, Revision 6.0, Feb. 1999, pp. 1-77.
Schwartz, Thread Local Storage—The C++ Way, The Code Project, Aug. 2004, pp. 1-9.

*Primary Examiner* — Diem Cao (57) ABSTRACT

A computer readable storage medium containing a program which, when executed by a processor, performs an operation of emulating static thread local storage of an executable software code at runtime, is disclosed. The operation includes executing the executable software code within a process memory space. During the execution of the executable software code, an occurrence of an event that is associated with a thread create operation is monitored. When the monitored event occurs, a thread data block duplicate is established within the process memory space and associated with a thread created by the thread create operation. The thread data block duplicate is configured to be accessed by executing a thread local storage callback function.

20 Claims, 6 Drawing Sheets

RUNTIME EMULATING STATIC THREAD LOCAL STORAGE OF PORTABLE EXECUTABLE SOFTWARE CODE

CLAIM OF PRIORITY

This present application is a continuation of U.S. application Ser. No. 12/973,664 filed on Dec. 20, 2010, which is a continuation of earlier filed U.S. application Ser. No. 11/552,734, now U.S. Pat. No. 7,856,637, filed on Oct. 25, 2006, which is wholly incorporated by reference herein.

CROSS REFERENCE TO RELATED APPLICATIONS

This application is related to U.S. application Ser. No. 11/381,715, entitled "Chained Hook Function Serving Multiple Versions Of Identically Named Dynamically Loaded Libraries," which is incorporated herein by reference.

BACKGROUND

Well known software code commonly contained in portable executable file format also known as PE file format, mainly includes information to be used by a well known Windows™ process loader. PE files are well known EXE or DLL files that are provided by the operating system and/or by an installed software application intended to run within the respective Windows™ operating system.

Upon initializing of a software application, the process loader commonly creates new processes in the operation system and uses the loaded PE image to determine various starting properties such as which memory addresses to initially allocate, how much stack space is required and the like as is well known in the art. The process loader also consults the PE image to determine what additional DLLs should be loaded before the process begins executing. These DLLs are commonly known as implicitly referenced DLLs.

DLL files may optionally specify what is known as Thread Local Storage Data Directory Element [TLS]. TLS instructs, via the process loader, the operating system to allocate and initialize a specific amount of data for each thread created while the related application is running. This is sometimes necessary so that individual threads can read and write data without interference from other threads. A thread is a well known part of a program that can execute independently of other program parts and eventually concurrently with other thread(s).

During runtime of the related application, the size of the initially allocated and initialized data cannot be changed since it would interfere with thread access. Hence, the Windows™ process loader processes only TLS information for implicitly referenced DLL files.

There are a number of shortcomings that come with the process loader's automatic loading of implicitly referenced DLLs prior to application run. The process loader has limited facilities for programmatically determining where a DLL should be loaded from and which version should be used. The process loader does not provide facilities for loading DLLs from data streams, compressed archives, or application specific encrypted storage. The process loader significantly limits a streamlined application startup during which only immediately needed DLLs are loaded. Therefore, there exists a need for dynamically and programmatically loading DLLs during runtime of the respective application. The present invention addresses this need.

SUMMARY

The embodiments of the present invention emulates a Windows™ process loader for dynamic TLS data allocation during respective application runtime. This is accomplished in several steps. First, the total required size of all TLS data blocks is calculated for implicitly referenced DLLs and/or runtime to be loaded DLLs that contain a TLS directory. Next, a pre-initialized data block duplicate of the previously calculated size is created preferably after initializing execution of the respective application. Total TLS data block calculation and data block duplicate creation may also be provided at a time prior to application initialization, in case of which the data block duplicate may be stored prior to its use. While the application is running, an event notification system generates a number of event notifications associated with intercepted runtime DLL loading and/or intercepted runtime DLL freeing and/or runtime thread create calling and/or runtime thread exit calling made by and/or in association with the application. Upon receipt of a specific event notification, a previously created thread data block duplicate is allocated. The thread data block duplicate is allocated for a thread created by the intercepted runtime thread create call. Upon receipt of other types of event notifications, a thread local storage callback function associated with an intercepted runtime loaded DLL and/or an intercepted runtime freed DLL is executed. The event notification system may be based on a well known debugging system. The event notification system may also incorporate for runtime interception a hooking system such as one described in the cross referenced application.

In one embodiment, a computer readable storage medium containing a program which, when executed by a processor, performs an operation of emulating static thread local storage of an executable software code at runtime, is disclosed. The operation includes executing the executable software code within a process memory space. During the execution of the executable software code, an occurrence of an event that is associated with a thread create operation is monitored. When the monitored event occurs, a thread data block duplicate is established within the process memory space and associated with a thread created by the thread create operation. The thread data block duplicate is configured to be accessed by executing a thread local storage callback function.

In another embodiment, a method for emulating static thread local storage of an executable software code at runtime is disclosed. The method includes executing the executable software code within a process memory space. During the execution of the executable software code, an occurrence of an event that is associated with a thread create operation is monitored. When the monitored event occurs, a thread data block duplicate is established within the process memory space and associated with a thread created by the thread create operation. The thread data block duplicate is configured to be accessed by executing a thread local storage callback function.

In yet another embodiment, a system is disclosed. The system includes a computer system having an operating system. The system also includes a module executable by the operating system. The module is configured to emulate static thread local storage of an executable software code at runtime, the module further configured to perform an operation. The operation includes executing the executable software code within a process memory space. During the execution of the executable software code, an occurrence of an event that is associated with a thread create operation is monitored. When the monitored event occurs, a thread data block duplicate is established within the process memory space and associated with a thread created by the thread create operation. The thread data block duplicate is configured to be accessed by executing a thread local storage callback function.

DETAILED DESCRIPTION

Figure 1:
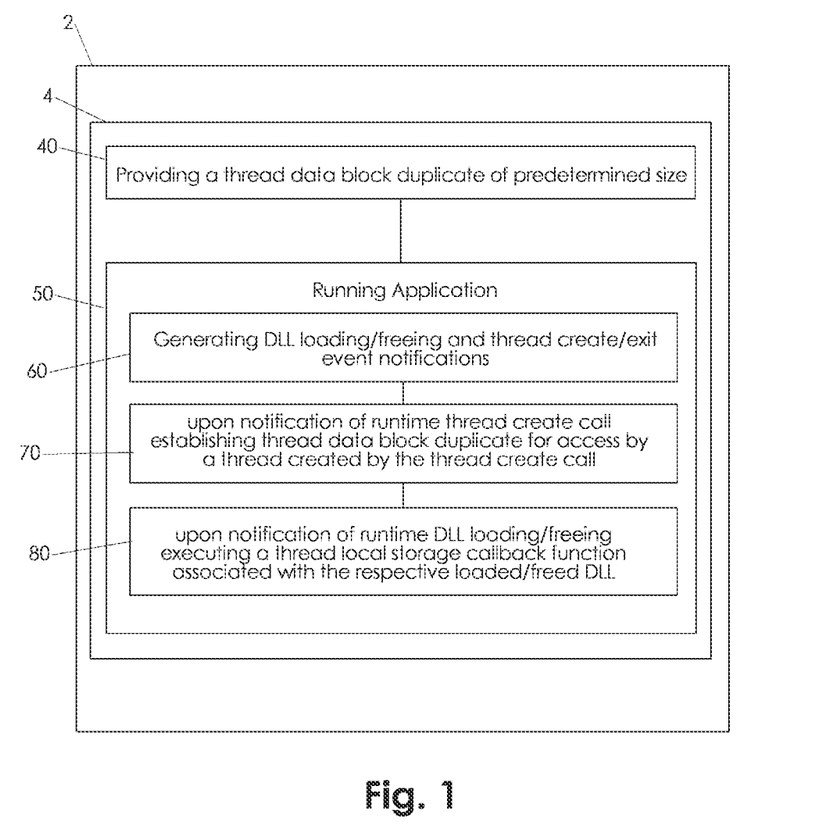
FIG. 1 is an overview block diagram of a first embodiment of the present invention.

Referring to FIG. 1 and according to a first embodiment of the invention, a method for runtime emulating a static thread local storage of a portable executable software code includes the step 40 of providing a thread data block duplicate computerized establishable within an isolated process memory area 4 within which the method of the present invention is practiced. The thread data block duplicate may be of predetermined size within the isolated process memory area 4 and may be provided for example by uploading it from well known computer storage memory. The isolated process memory area 4 may be provided by an operating system 2 such as Windows™.

The thread data block duplicate may be configured to provide one or more partitions while established within the isolated process memory area. Number and size of the individual partitions may be predetermined by recursively scanning a portable executable image for static DLL imports which contain IMAGE_DIRECTORY_ENTRY_TLS Data directory elements. In case the provided thread data block duplicate is not partitioned at the beginning of application execution and/or application initialization, the provided thread data block duplicate may be initialized after the application has begun executing.

At step 50, an application is initialized and executed within the isolated process memory area 4. The application is related to the portable executable software code. While the application is running, at step 60, an event notification system generates first, second, third and fourth event notifications as indicated. The event notification system may be a well known hooking system and/or debugger system. The hooking system may be any well known system but preferably one as described in the cross referenced application. The debugging system may be implemented using Windows™ Debugger API. The Windows™ Debugger API provides built in mechanisms for receiving notifications for DLL Loading, DLL Unloading, Thread Creation, and Thread removal.

The first event notification is associated with an intercepted runtime DLL loading. The second event notification is associated with an intercepted runtime DLL freeing. The third event notification is associated with an intercepted runtime thread create call. The fourth event notification is associated with an intercepted runtime thread exit call. The intercepted runtime DLL loading, DLL freeing, thread create call thread exit call are made by the application. First, second, third and fourth event notifications may occur in any succession.

At step 70 and upon occurrence of the third event notification, the thread data block duplicate is established in the isolated process memory area 4 for access by a thread created by the intercepted runtime thread create call. At step 80 and upon occurrence of the first event notification and/or the second event notification, a thread local storage callback function is executed. The thread local storage callback function is associated with one of a loaded DLL and a freed DLL. The loaded DLL is loaded during intercepted runtime DLL loading, and the freed DLL is freed during intercepted runtime DLL freeing.

Figure 5:
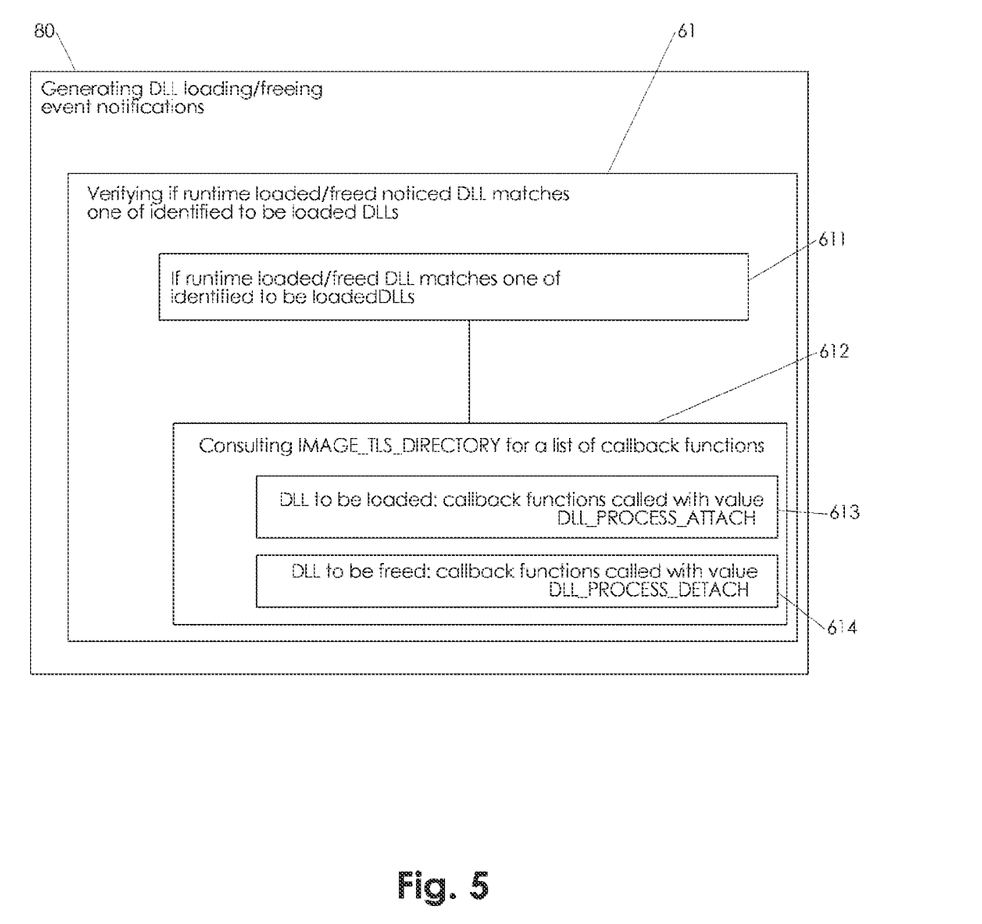
FIG. 5 is a detail block diagram of step 80 depicted in FIGS. 1 and 2 in accordance with one or more embodiments.

Referring to FIG. 5, once a DLL loaded by the application is noticed via the first event notification, at step 61, a determination is made if the noticed loaded DLL matches one of previously known runtime to be loaded DLLs. Runtime to be loaded DLLs may be previously known by examining a set of files associated with a specific application installation and scanning said files which exist in the portable executable file format and which also contain a IMAGE_DIRECTORY_ENTRY_TLS structure. If a match is found and in case of a Windows™ operating system 2, at step 612, a well known structure IMAGE_TLS_DIRECTORY is consulted for a list of thread local storage callback functions. If a runtime to be loaded DLL matches, at step 613, a thread local storage callback function may be called with a well known value DLL_PROCESS_ATTACH. At step 614, in case of a runtime to be freed DLL match, the callback function may be called with a well known value DLL_PROCESS_DETTACH.

Figure 2:
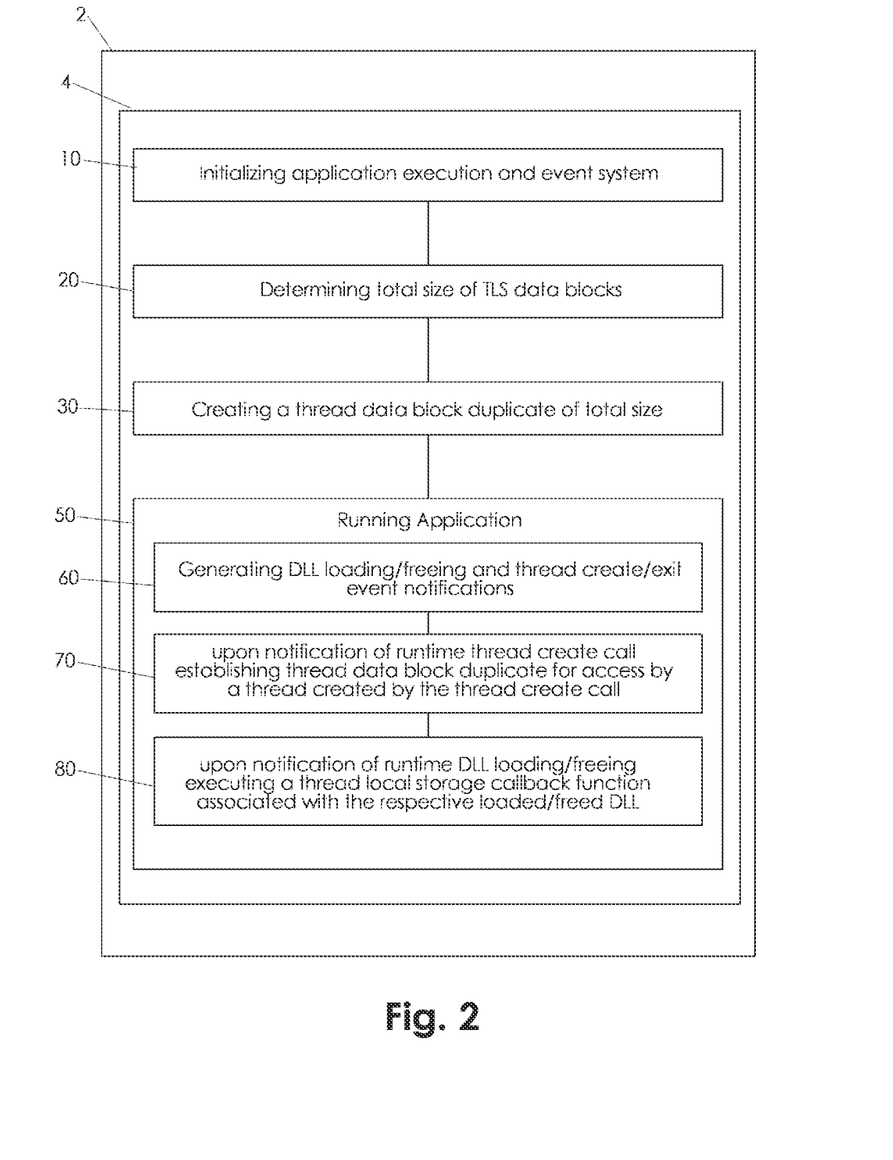
FIG. 2 is an overview block diagram of a second embodiment of the present invention.

Referring to FIG. 2 and according to a second embodiment of the invention, at step 30, the thread data block duplicate is created following the initializing of application execution as illustrated in step 10. The total size of all relevant static thread local storage may be previously known via by examining a set of files associated with a specific application installation and scanning said files which exist in the portable executable file format and which also contain a IMAGE_DIRECTORY_ENTRY_TLS structure and accessed for creating the thread data block duplicate with a matching total size.

Figure 3:
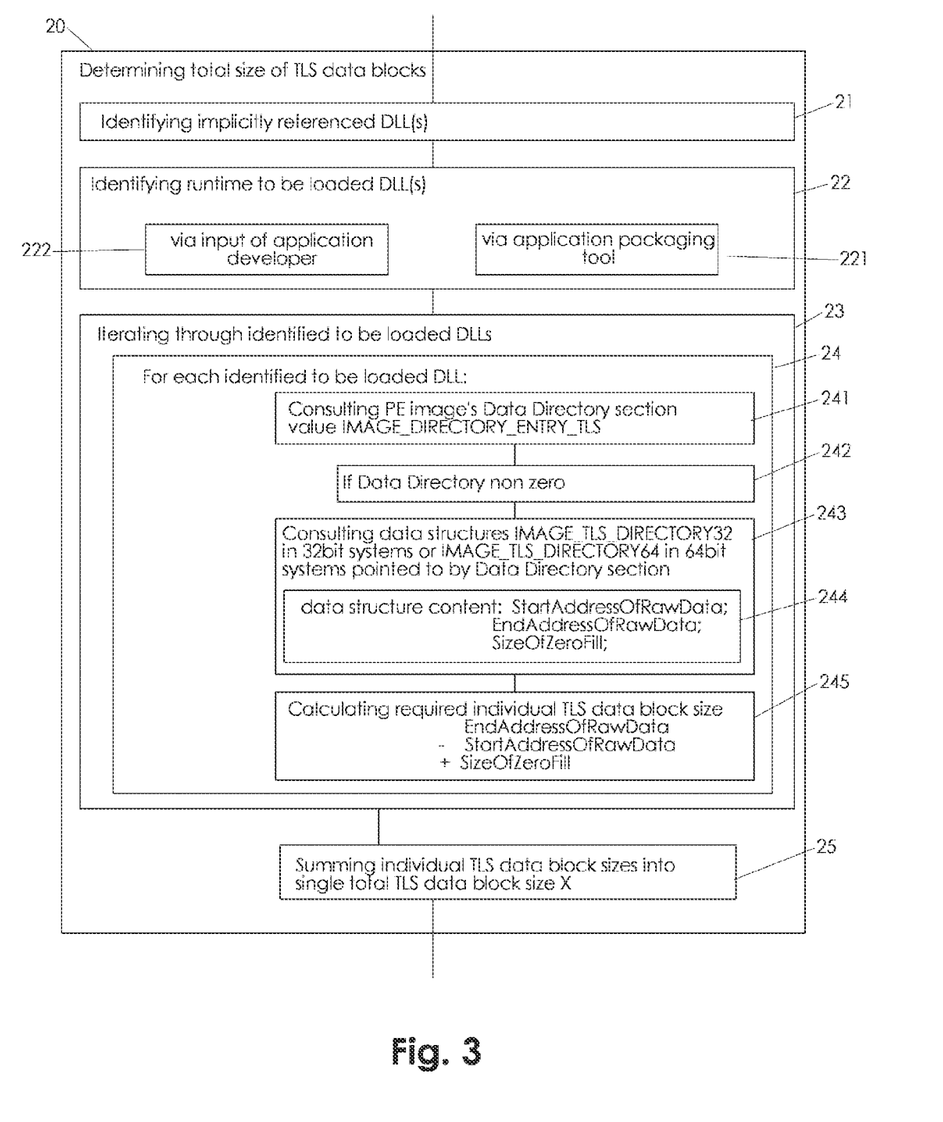
FIG. 3 is a detail block diagram of step 20 depicted in FIG. 2 in accordance with one or more embodiments.

Nevertheless and as indicated in step 20 and FIG. 3, the total size X of all relevant static thread local storage may be determined following the initializing of the application execution. At step 21, well known implicitly referenced DLL(s) are identified followed by step 22 of identifying runtime to be loaded DLL(s). At step 222, runtime to be loaded DLL(s) may be identified via input of an application developer and provided as a set of files associated with a specific application. At step 221, runtime to be loaded DLL(s) may also be identified via an application packaging tool such as a commercially available product called Thinstall™. Next, at step 23, the identified to be loaded DLL(s) are iterated. At step 24, for each identified to be loaded DLL, a required individual thread local storage block size is calculated in a number of steps 241-245 before in step 25 the required individual thread local storage block size(s) are summed up to a total size X of the single thread local storage data block. At step 241, a data directory section of an image of the portable executable software code is consulted. In case of a Windows™ operating system 2, the consulted data directory section may be well known as by the index defined as IMAGE_DIRECTORY_ENTRY_TLS. Next, at step 242, a determination is made if that data directory section is non zero.

If the condition of step 242 is met, and in case the operating system 2 is a 32 bit operating system, at step 243, a well known data structure IMAGE_TLS_DIRECTORY_32 is consulted. In case of a 64 bit operating system 2 and the data directory section is non zero, a well known data structure IMAGE_TLS_DIRECTORY_64 is consulted. Both IMAGE_TSL_DIRECTORY_32 and IMAGE_TLS_DIRECTORY_64 may be pointed to by the respective data directory section.

At step 244, each of IMAGE TLS DIRECTORY 32 and IMAGE TLS DIRECTORY 64 contains well known values StartAddressOfRawData, EndAddressOfRawData, and SizeOfZeroFill. Next as illustrated in step 245, the required individual thread local storage data block size is calculated by subtracting StartAddressOfRawData from EndAddressOfRawData and adding SizeOfZeroFill.

Once the total size X is determined, at step 30 (FIG. 2 and FIG. 4), a thread data block duplicate of total size X may be created. At step 31, the thread data block duplicate may be initialized for example with a value IBLOCK. In the following step 32 it may be iterated through the identified to be loaded DLL(s). According to step 33 and for each identified to be loaded DLL within a Windows™ operating system a data directory section of an image of the portable executable software code may be consulted to a well known structure IMAGE_DIRECTORY_ENTRY_TLS as shown in step 331 followed by step 332 of determining if the respective data directory section has a data entry that is non zero.

Figure 4:
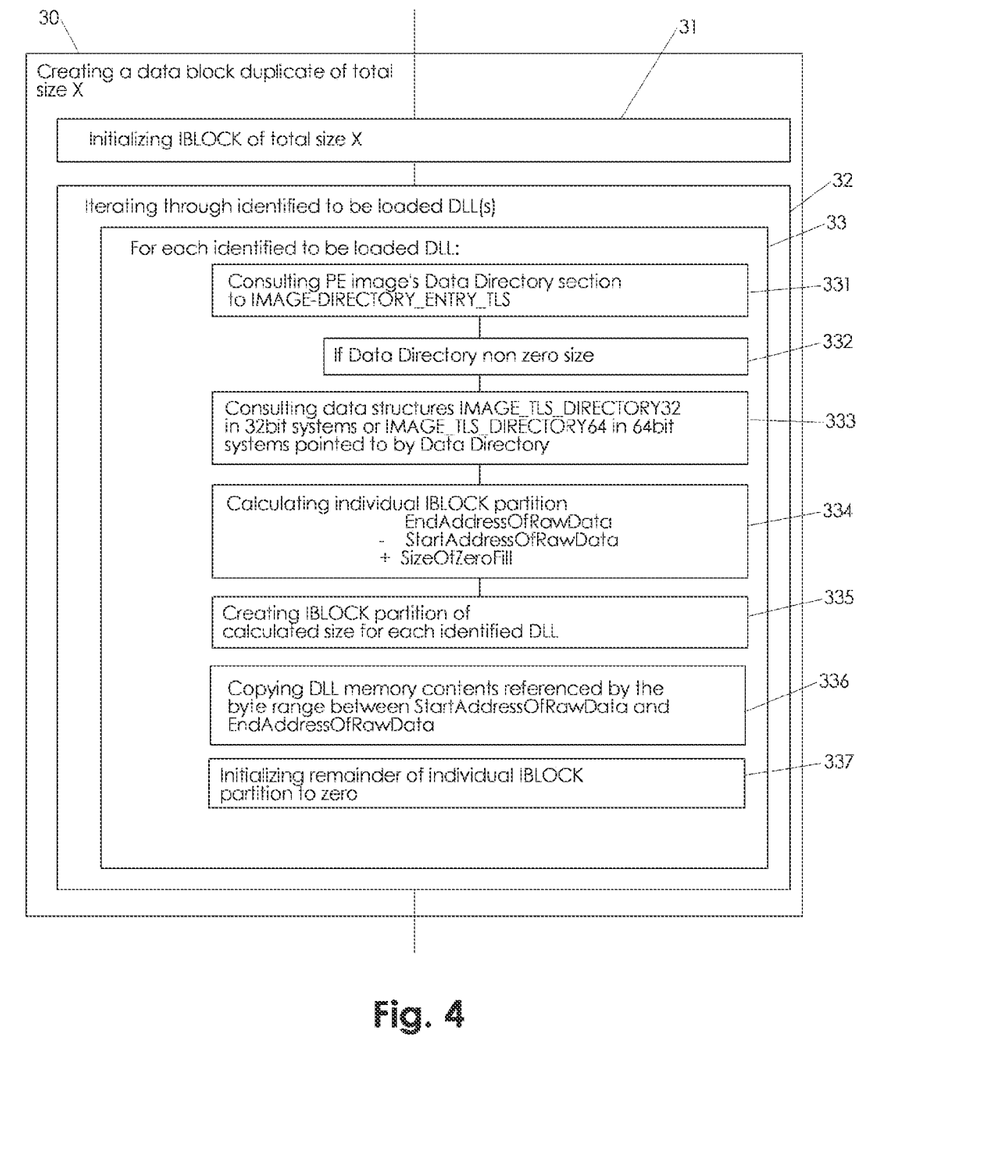
FIG. 4 is a detail block diagram of step 30 depicted in FIG. 2 in accordance with one or more embodiments.

In case the data directory section is non zero and in case the operating system 2 is a 32 bit operating system, at step 333, a well known data structure IMAGE_TLS_DIRECTORY_32 is consulted. In case of a 64 bit operating system 2 and the data directory section is non zero a well known data structure IMAGE TLS DIRECTORY 64 is consulted. Both IMAGE_TLS_DIRECTORY_32 and IMAGE_TLS_DIRECTORY_64 may be pointed to by the respective data directory section.

Next, at step 334, a partition size of the thread data block duplicate is calculated by subtracting StartAddressOfRawData from EndAddressOfRawData and adding SizeOfZeroFill. At step 335, the partition is created with the calculated partition size in a well known fashion and at step 336, a memory contents of the respective to be loaded DLL is copied. The respective memory contents referenced by a byte range between respective StartAddressOfRawData and respective EndAddressOfRawData. At step 337, the remainder of the memory size corresponding partition is initialized to zero in a well known fashion.

In case of the first embodiment with a provided thread data block duplicate of previously known total size X, step 31 may be omitted. For each of the noticed to be loaded DLLs a partition corresponding in memory size to a respective one to be loaded DLL may be separated within the thread data block duplicate.

Figure 6:
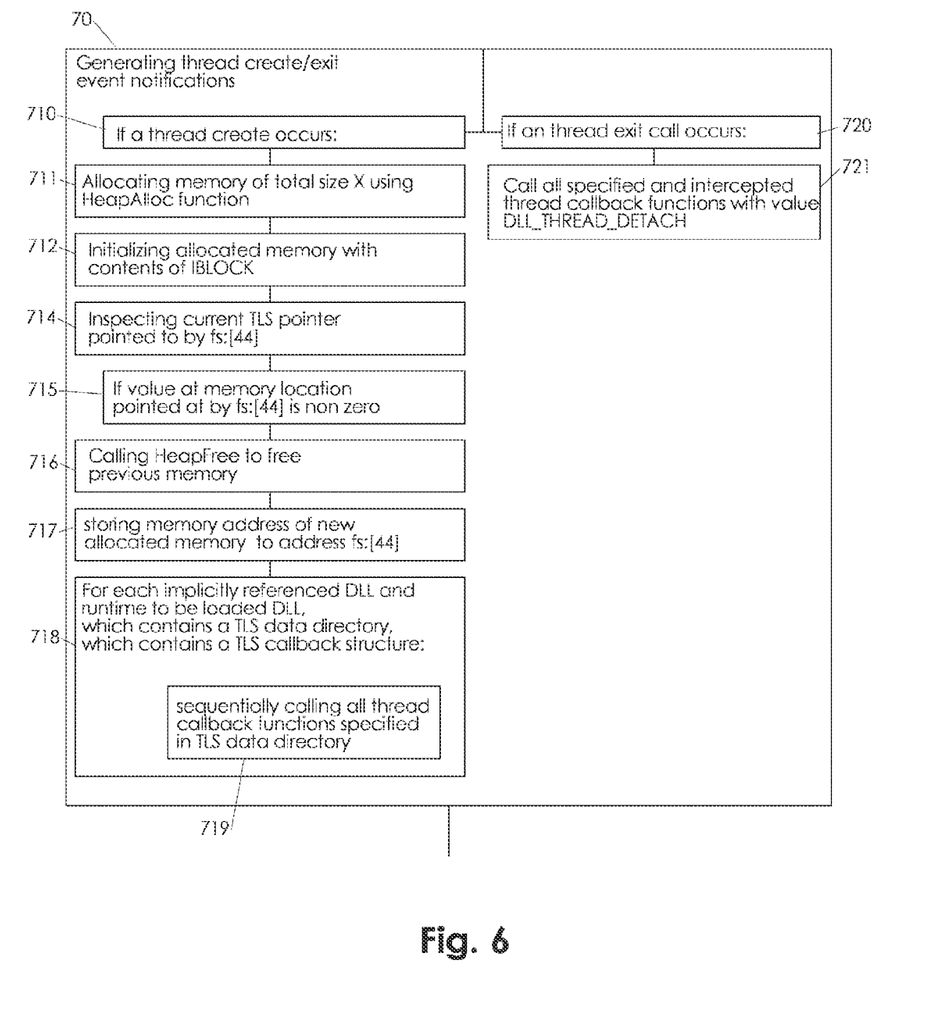
FIG. 6 is a detail block diagram of step 70 depicted in FIGS. 1 and 2 in accordance with one or more embodiments.

Again in case of a Windows™ operating system and in case of a third event notification notifying a new thread creation as in step 710 of FIG. 6, steps 711-718 of FIG. 6 take place. At step 711, memory of the previously calculated total size X is allocated within the isolated process memory area using a well known function HeapAlloc. Next, at step 712, the allocated memory is initialized with the contents of the thread data block duplicate followed by step 714 of inspecting a current thread local storage pointer pointed to by the CPU memory segment fs, offet 44 (fs:[44]). Fs:44 is used by Windows™ as a pointer to a thread-specific memory storage block. At step 715, in case the value at the memory location pointed at by fs:[44] is non zero, at step 716, a well known function HeapFree is called to free the previous memory. At step 717, a memory address of the allocated memory is stored to an address of fs:[44].

Then, at steps 718 and 719, a number of the thread local storage callback functions are sequentially called for each implicitly referenced DLL(s) and runtime to be loaded DLL(s). The sequentially called thread callback functions are specified in a data directory of the implicitly referenced DLL(s) and/or the runtime to be loaded DLL(s). Also in case of a Windows™ operating system and in case of a fourth event notification notifying a thread exit as in step 720 of FIG. 6, all intercepted thread callback function(s) is/are called with a well known value DLL_THREAD_DETACH.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. In one embodiment, the apparatus can be specially constructed for the required purpose (e.g., a special purpose machine), or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The embodiments of the present invention can also be defined as a machine that transforms data from one state to another state. The transformed data can be saved to storage and then manipulated by a processor. The processor thus transforms the data from one thing to another. Still further, the methods can be processed by one or more machines or processors that can be connected over a network. The machines can also be virtualized to provide physical access to storage and processing power to one or more users, servers, or clients. Thus, the virtualized system should be considered a machine that can operate as one or more general purpose machines or be configured as a special purpose machine. Each machine, or virtual representation of a machine, can transform data from one state or thing to another, and can also process data, save data to storage, display the result, or communicate the result to another machine.

The programming instructions and modules can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible/non-transitory medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method comprising:
   executing software code within a process memory space;
   generating a thread data block duplicate, wherein generating the thread data block duplicate includes:
      identifying one or more known implicitly-referenced dynamic link libraries (DLLs) associated with the executable software code;
      identifying runtime to be loaded DLLs associated with the executable software code; and
      determining a size of the thread data block duplicate based on local storage block sizes calculated for the identified one or more implicitly-referenced DLLs and the identified runtime to be loaded DLLs;
   monitoring an occurrence of an event associated with a thread create operation during an execution of the software code;
   determining that the event has occurred;
   in response to determining that the event has occurred, allocating the thread data block duplicate within the process memory space for access by a thread created by the thread create operation; and
   executing the thread, wherein executing the thread includes accessing the thread data block duplicate.

2. The method of claim 1, wherein generating a thread data block duplicate within the process memory space further includes configuring the thread data block duplicate to provide one or more partitions based upon the one or more implicitly-referenced DLLs in the executable software code.

3. The method of claim 1, wherein generating a thread data block duplicate within the process memory space further includes configuring the thread data block duplicate to provide one or more partitions based upon the one or more runtime to be loaded DLLs in the executable software code.

4. The method of claim 3, wherein the one or more runtime to be loaded DLLs are identified through at least one of an application developer input and an application packaging tool.

5. The method of claim 3, wherein a number of the partitions is equal to a number of the one or more runtime to be loaded DLLs and a size of each of the one or more partitions is calculated based on a size of each of the one or more runtime to be loaded DLLs.

6. The method of claim 5, wherein the size of each of the partitions is calculated prior to establishing the thread data block duplicate.

7. The method of claim 5, wherein a size of the thread data block duplicate corresponds with combined size of the one or more partitions.

8. The method of claim 1, further comprising determining a size of the thread data block duplicate based on a sum of the local storage block sizes calculated for the one or more implicitly-referenced DLLs identified and the one or more to be loaded DLLs identified.

9. A system, comprising:
   a computer system having an operating system;
   a module executable by the operating system, the module configured to emulate static thread local storage of an executable software code at runtime, the module further configured to perform an operation, the operation comprising:
      executing software code within a process memory space;
      generating a thread data block duplicate, wherein generating the thread data block duplicate includes:
         identifying one or more known implicitly-referenced dynamic link libraries (DLLs) associated with the executable software code;
         identifying runtime to be loaded DLLs associated with the executable software code; and
         determining a size of the thread data block duplicate based on local storage block sizes calculated for the identified one or more implicitly-referenced DLLs and the identified runtime to be loaded DLLs;
      monitoring an occurrence of an event associated with a thread create operation during an execution of the software code;
      determining that the event has occurred;
      in response to determining that the event has occurred, allocating the thread data block duplicate within the process memory space for access by a thread created by the thread create operation; and
      executing the thread, wherein executing the thread includes accessing the thread data block duplicate.

10. The system of claim 9, wherein generating a thread data block duplicate within the process memory space further includes configuring the thread data block duplicate to provide one or more partitions based upon the one or more implicitly-referenced DLLs in the executable software code.

11. The system of claim 9, wherein generating a thread data block duplicate within the process memory space further includes configuring the thread data block duplicate to provide one or more partitions based upon the one or more runtime to be loaded DLLs in the executable software code.

12. The system of claim 11, wherein the one or more runtime to be loaded DLLs are identified through at least one of an application developer input and an application packaging tool.

13. The system of claim 11, wherein a number of the partitions is equal to a number of the one or more runtime to be loaded DLLs and a size of each of the one or more partitions is calculated based on a size of each of the one or more runtime to be loaded DLLs.

14. The system of claim 13, wherein the size of each of the partitions is calculated prior to establishing the thread data block duplicate.

15. The system of claim 13, wherein a size of the thread data block duplicate corresponds with combined size of the one or more partitions.

16. The system of claim 9, wherein the operation further comprises determining a size of the thread data block duplicate based on a sum of the local storage block sizes calculated for the one or more implicitly-referenced DLLs identified and the one or more to be loaded DLLs identified.

17. A non-transitory computer readable storage medium containing a program which, when executed by a processor, performs an operation of emulating static thread local storage of an executable software code at runtime, the operation comprising:
   executing software code within a process memory space;
   generating a thread data block duplicate, wherein generating the thread data block duplicate includes:
      identifying one or more known implicitly-referenced dynamic link libraries (DLLs) associated with the executable software code;
      identifying runtime to be loaded DLLs associated with the executable software code; and
      determining a size of the thread data block duplicate based on local storage block sizes calculated for the identified one or more implicitly-referenced DLLs and the identified runtime to be loaded DLLs;
   monitoring an occurrence of an event associated with the thread create operation during an execution of the software code;
   determining that the event has occurred;
   in response to determining that the event has occurred, allocating the thread data block duplicate within the process memory space for access by a thread created by the thread create operation; and executing the thread, wherein executing the thread includes accessing the thread data block duplicate.

18. The non-transitory computer-readable storage medium of claim 17, wherein generating a thread data block duplicate within the process memory space further includes configuring the thread data block duplicate to provide one or more partitions based upon one or more of the following: the one or more implicitly-referenced DLLs in the executable software code, and the one or more runtime to be loaded DLLs in the executable software code.

19. The non-transitory computer-readable storage medium of claim 18, wherein a number of the partitions is equal to a number of the one or more runtime to be loaded DLLs and a size of each of the one or more partitions is calculated based on a size of each of the one or more runtime to be loaded DLLs.

20. The non-transitory computer-readable storage medium of claim 18, wherein the operation further comprises determining a size of the thread data block duplicate based on a sum of the local storage block sizes calculated for the one or more implicitly-referenced DLLs identified and the one or more to be loaded DLLs identified.

* * * * *